United States Patent [19]

Proper

[11] Patent Number: 4,530,048
[45] Date of Patent: Jul. 16, 1985

[54] VCR BACKUP SYSTEM

[75] Inventor: John D. Proper, Costa Mesa, Calif.

[73] Assignee: Alpha Microsystems, Irvine, Calif.

[21] Appl. No.: 384,907

[22] Filed: Jun. 4, 1982

[51] Int. Cl.³ ............................ G06F 3/06; G11B 5/00
[52] U.S. Cl. ...................................... 364/200; 360/15; 360/32; 371/38
[58] Field of Search ..................... 371/38, 10; 360/15, 360/32; 364/200 MS File, 900 MS File; 358/903; 340/347 DA

[56] References Cited

U.S. PATENT DOCUMENTS

| | | | |
|---|---|---|---|
| 3,922,669 | 11/1975 | Baldwin | 360/32 X |
| 4,041,463 | 8/1977 | Slutzky et al. | 364/900 |
| 4,138,694 | 2/1979 | Doi et al. | 360/32 X |
| 4,145,683 | 3/1979 | Brookhart | 371/38 |
| 4,224,642 | 9/1980 | Manatari et al. | 360/32 |
| 4,277,807 | 7/1981 | Baldwin | 360/32 |
| 4,380,047 | 4/1983 | Eisenhard et al. | 364/200 |

Primary Examiner—Jerry Smith
Assistant Examiner—Mark Ungerman
Attorney, Agent, or Firm—Harris, Kern, Wallen & Tinsley

[57] ABSTRACT

The present invention is a video casette recorder (hereinafter referred to as "VCR") backup controller that can be installed in a S-100 bus system which is compatible with NTSC, PAL and SECAM systems. The controller provides temporary storage and control capability for the S100 interface bus system. The controller organizes the data into data blocks and synchronizes the data to TV signals during the write mode. The control further replicates data for error detection in the read and write modes.

32 Claims, 13 Drawing Figures

VCR BACKUP SYSTEM

PRIOR ART

Various types of data storage systems are used in modern computer systems to store data for various purposes. By way of example, random access memory systems are used for temporary storage of data to allow data manipulation and processing by the computer, due to the relatively fast access such memories provide. Current random access memories, however, are generally semiconductor memories which are relatively expensive and characterized as volatile memory storage devices, i.e. the data stored therein is lost upon loss of power thereto. As a result, random access memory is suitable only for a relatively high speed temporary storage and not for bulk data storage.

For the foregoing reasons, modern computer systems generally have some bulk data storage system separate and apart from the random access memory. While various types of bulk storage may be used, the most common bulk storage systems are floppy disk systems and hard disk systems. Floppy disk systems utilize a user removable media, i.e. floppy disks, so that the total storage capability is dependent upon the number of discs one is willing to use in any particular application. While such systems have the advantage of relatively low cost, they have the disadvantage of somewhat long read and write times because of the relatively low rate of rotation of the disk. Further, for any substantial bulk storage, more than one disk must be used thereby generally requiring operator assistance, and, generally the storage of more than a few megabytes of data may require an unmanageable number of separate disks. Hard disk systems generally have much higher storage capability on a single disk and have substantially better read and write time capabilities than floppy disk systems because of the much higher rate of rotation of the disk. They have the disadvantage, however, of being quite expensive.

In any computer system there is a risk of failure of the primary bulk storage system (today typically hard disk or floppy disk) either because the storage medium fails or there is some system failure which either permanently renders the data unreadable or even erases the desired data. Consequently because of the cost of reconstructing the data at any time from written or other records, it is highly desirable, even substantially mandatory in many applications, that some form of bulk storage capability be provided to always maintain a backup copy of the data so that the data cannot be lost by any single system failure.

One approach which can be used to account for system failures is to run extra copies of the data using either the primary or a backup floppy disk system. While the capital equipment costs of this approach may be relatively low, or even negligible if the primary bulk storage is also floppy disk, this approach has a disadvantage that it requires operator assistance either tying up the system during normal day-time hours for backup purposes or requiring an operator during periods of normal system non-use merely to periodically obtain the backup copies. The operator problem can be eliminated by using a backup hard disk system though the cost of such system is quite high generally deterring the widespread use of such systems for backup purposes.

Recently, backup storage systems have been introduced which are referred to as streaming tape drives which generally use some form of high speed data cassettes. Such systems generally have a read head following the write head so that the data written may be immediately read for error checking purposes and immediately rewritten if errors are detected. During storage the tape is run continuously at a high speed with data streaming on to the tape, any portion thereof only being rewritten if it could not be accurately read just after being written.

Such systems have the advantage of very high storage capacity on a single cassette, so that a backup copy of the data may readily be made on a single cartridge during off hours without operator assistance. They generally are not usable for primary bulk storage because of their serial access characteristic. Streaming tape drives are generally not manufactured in the same quantities as hard and floppy disc systems and accordingly are currently still quite expensive. Further, while the read following write double checks the initial readability of the data and the tape to improve the reliability of such systems, there are of course other failures due to subsequently scratched, broken or otherwise damaged tapes which renders the reliability of such backup systems less than perfect. Further, because of the special purpose nature of such systems the speed of repair of such systems, particularly upon any form of mechanical failure, may be quite limited by the limited availability of repair parts and trained personnel.

Thus recently there have been attempts to use video cassette recorders (VCRs) intended for consumer use as recording devices for backup storage systems. VCRs have the advantages of potentially very high data storage capabilities, relatively low cost and local repair and/or replacement capabilities. However, system VCR backup storage systems have not come into general usage for various reasons including the heretofore achieved lack of reliability in the storage technique and the inability to visually perceive the data storage for system monitoring and/or trouble shooting purposes. Therefore, a need remains for a reliable and simple system for utilizing the relatively low cost and great data storage capability of VCRs to achieve a low cost reliable and readily maintained backup storage system.

BRIEF DESCRIPTION OF THE DRAWINGS

FIG. 10 is a detailed circuit diagram of the CRC generator/detector.

SUMMARY OF THE INVENTION

The present invention is a video casette recorder (hereinafter referred to as "VCR") backup controller that can be installed in a S-100 bus system which is compatible with NTSC, PAL and SECAM systems. The controller provides temporary storage and control capability for the S100 interface bus system. The controller includes an onboard RAM buffer and onboard CRC error checking so that each soft error of the system will be displayed.

During write mode, data blocks comprising a plurality of data bytes will be received from the S100 bus and will be temporarily stored in the random access memory ("RAM") in the controller through a direct memory access ("DMA") operation. The RAM is segmented in a number of sections so that the stored data may be read out through a direct memory access operation. For transfer from the controller RAM to the VCR output, the data is formated into data blocks and synchronized with TV signals. Each data block is replicated a predetermined number of times for error detection.

During the read mode, a signal from the VCR will be fed into the controller through an analog to digital converter. The TV blanking and sync signals will be trimmed out. Only the data byte stream will be recovered. The data from the video tape recorder is temporarily stored in the RAM in the controller through the DMA. When the RAM is full, the contents are applied to the S100 bus, while new data is temporarily stored in the RAM. The data from the VCR is replicated for error detection.

In the read and write modes the data is checked for errors using a CRC chip. The data is fed into the CRC chip such that if there are no errors, the successive identical data blocks will be ignored. If an error is indicated, the replicated data blocks will be read until there is no error or there are no more identical blocks, in which case a hard error will be indicated.

DETAILED DESCRIPTION OF THE INVENTION

The read mode represents the functions the controller performs when it reads the data from the VCR, checks the data and provides th checked data to the S100 bus. The write mode represents the functions the controller performs when it transfers data from the S100 bus, formats the data and presents it to the VCR for recording. The functions of the circuits utilized in the preferred embodiment will be described with respect to their utilization in the read or write mode.

Figure 1:
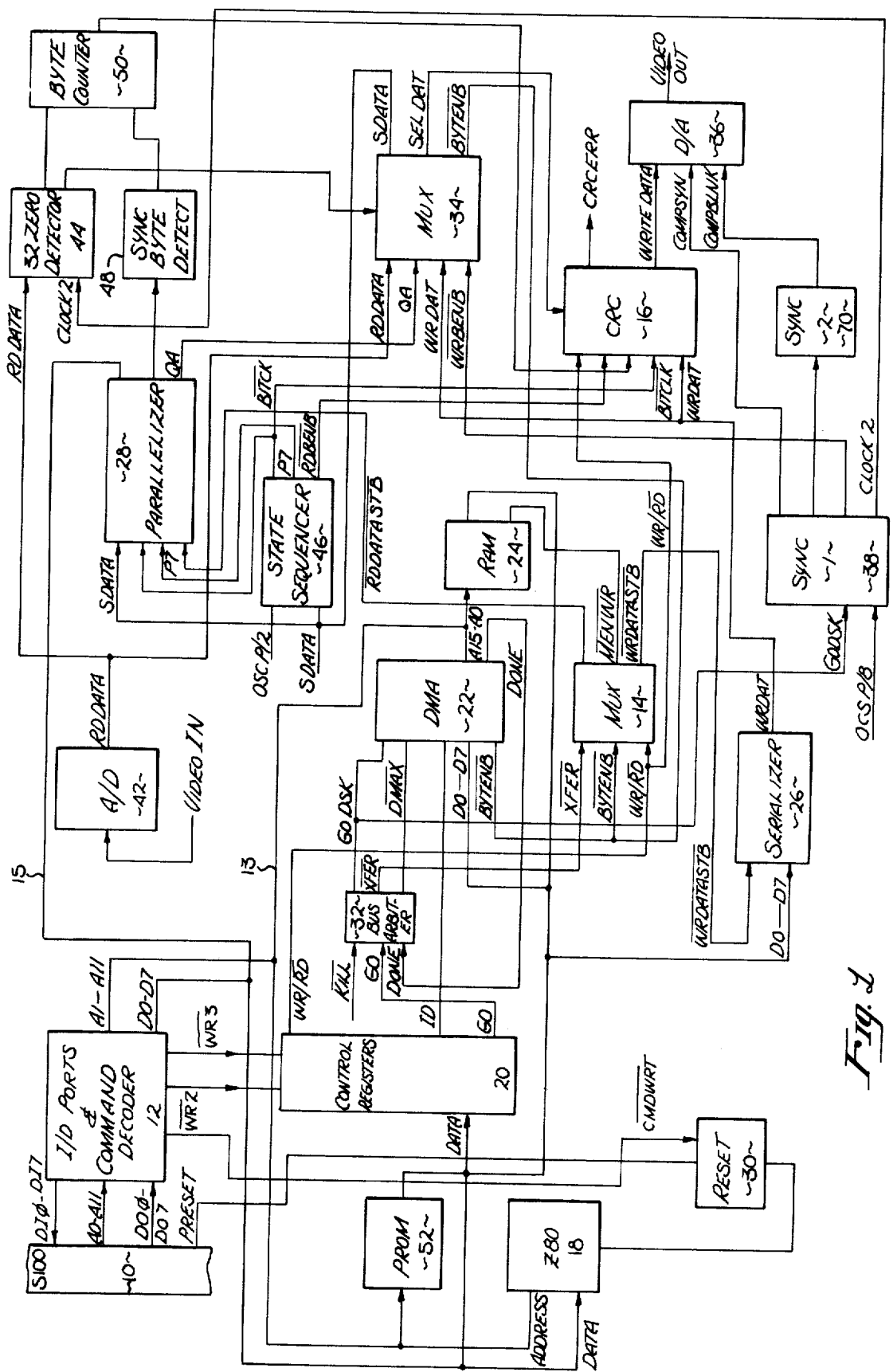
FIG. 1 is a block diagram of the VCR controller of the present invention.

Referring first to FIG. 1, a block diagram illustrating a typical VCR controller in accordance with the present invention may be seen. As previously mentioned, the controller has both a read capability which is shown in the upper right portion of FIG. 1 and a write capability, which is shown in the lower right portion of FIG. 1.

As shown in FIG. 1, the S100 bus 10 is connected to I/O ports and command decoder 12 to transfer S100 data streams DO0-DO7 and S100 address information AD0-AD11 from the S100 bus, and VCR data streams DI0-DI7 onto the S100 bus. The RD/WR command 20 generates either a read signal for the read mode (to read data signals from the VCR to the S100 bus) or a write signal for the write mode (to write data signals from the S100 to the VCR) to multiplexer 14 and CRC generator 16. The I/O ports and command decoder 12 transfers data streams onto and from controller data bus 15 which are connected to the microprocessor ("Z80") 18, direct memory access (DMA) 22 and random access memory (RAM) 24. Data bus 15 is also connected to serializer 26, parallelizer 28 and control register circuit 20.

The Z80 18 is connected to reset circuit 30 which initializes the Z80 in response to address information received from the S-100 bus 10. The Z80 is also connected to control registers circuit 20 through the data bus 15. Circuit 20 generates control signals which initialize the DMA 22. The GO output from control circuit 20 is connected to BUS ARBITER 32. The BUS ARBITER gets the Z80 off the data bus 15 and gives the DMA access to the address bus 13. The DMAX output acknowledges the DMA's access to the address bus. Upon receipt of a first address bit and a byte enable signal (BYTENB) from multiplexer 34, the DMA generates memory address for DMA sequential transfer of data to or from RAM 24. RAM 24 sequentially provides temporary storage in the controller for storing data bytes received from the S100 prior to writing to the VCR during the write mode, and for storing data received from the VCR prior to dumping the data onto the S100 bus during the read mode through data bus 15.

Multiplexer 14 responds to the transfer output (XFER) of the BUS ARBITER 32 and the BYTENB signals of multiplexer 34 to create a MEMWR signal which selects which memory location of the RAM 24 to input the first data byte. Multiplexer 14 generates the read data STROBE (RDDATASTB) for the read mode into parallelizer 28 and the write data STROBE (WRDATASTB) for the write mode into serializer 26. During the write mode, serializer 26 receives parallel on data bus 15 from RAM 24 and the write data STROBE from multiplexer 14 to generate a serial data (WRDAT) signal which is inputted into CRC generator 16. In response, the CRC generator then generates a write data (WRITE DATA) signal comprising the serial data and check bytes to the digital to analog converter 36. Simultaneously, the digital to analog converter 36 receives composite syncing signals from sync generator 38 and composite blanking signals from sync generator 40 such that the video signal will have a predetermined format. The digital to analog converter 36 mixes the WRITE DATA, the composite sync and the composite blanking signals and then converts the mixed digital signal to an analog video output.

During the read mode, the analog to digital converter 42 receives an analog video signal from the VCR and converts it to a digital data (RDDATA) signal. The RDDATA signal and a clocking signal from sync generator 38 are fed into 32 zero detector 44. When 32 zero's have been detected, a signal will be applied to byte counter 50 and multiplexer 34. The serial bit stream (RDDATA) and the QA signal from parallelizer 28 are also applied to multiplexer 34 to create a serial data stream (SDATA).

The SELDAT signal from multiplexer 34 is fed into CRC generator 16 to enable error checking. The SDATA signal from multiplexer 34 is received by state sequencer 46 and parallelizer 28. Sequencer 46 provides a read byte enable (RDBENB) signal to CRC generator 16. The output of byte counter 50 is also fed into CRC generator 16 to provide error checking during the read mode. State sequencer 46 also provides a bit clock (BITCLK) signal and a first state (P7) signal to parallelizer 28. Parallelizer 28 responds to these signals such that upon the receipt of the RDDATASTB from multiplexer 14, the parallelizer will convert the serial data (SDATA) stream into a parallel data stream which is then driven by the DMA through the I/O ports command 12 to the S100 bus 10.

Figure 2:
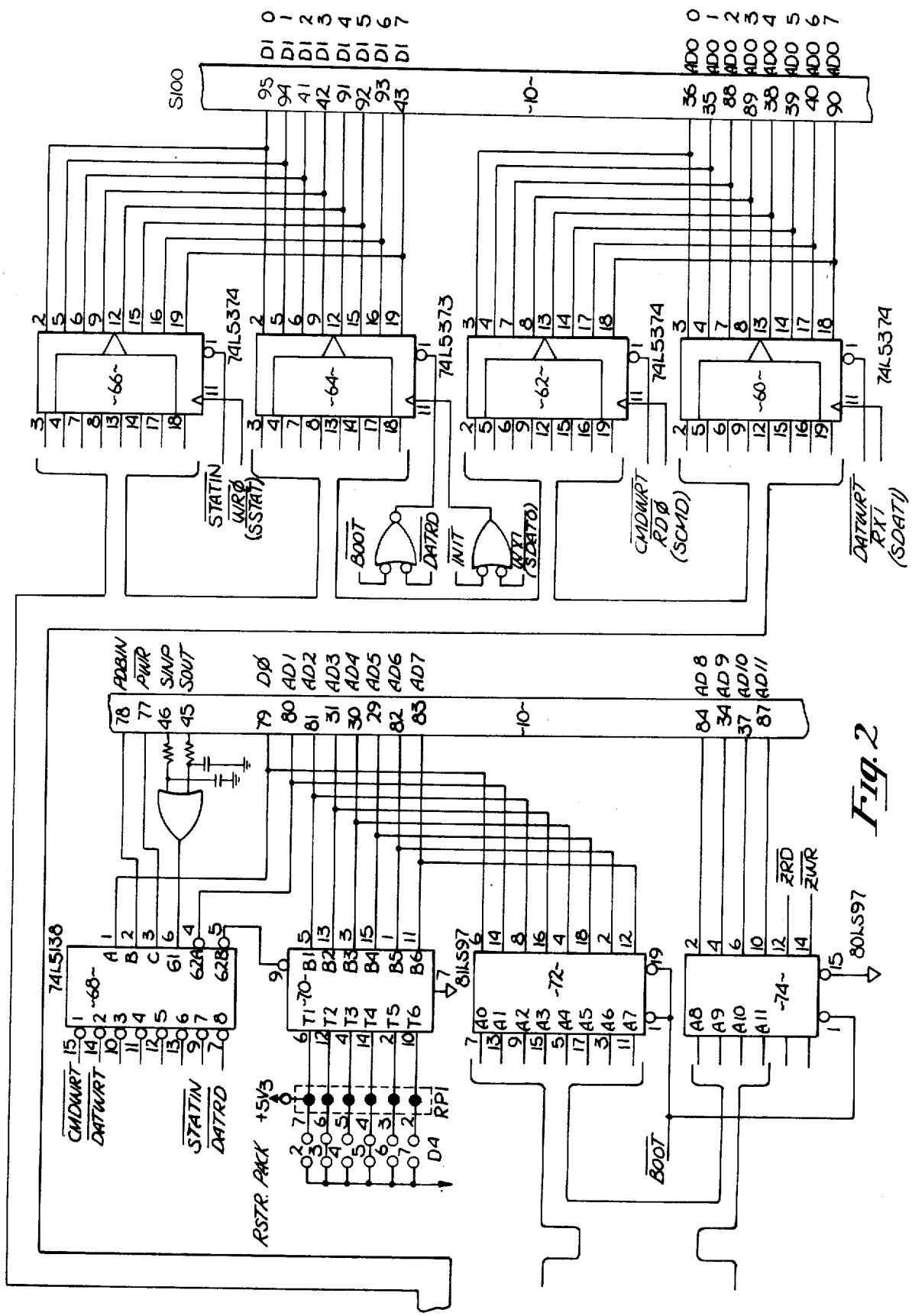
FIG. 2 is a detailed block diagram of the S100 bus and connections of the present invention.

Referring to FIG. 2, the S100 bus connections to the I/O ports and command decoders 12 are shown. The data outputs DO0-DO7 of the S100 bus 10 are connected to data register 60 and command register 62 of the I/O ports circuit 12. A non-zero data output from the S100 bus through command register 62 will be interpreted as a good command to the controller. The data inputs of the S100 bus, DI0-DI7, are connected to read out data register 64 and status register 66 of the I/O ports circuit. When a command has been received by command register 62, the status register 66 will provide an acknowledgment signal to the S100 bus 10 that the command has been received. When the command is completed, the Z80 will clear the status register 66. When a write command has been received, the data will be read out of read out data register 64. The status register and the read out data register are operative when the Z80 is in a write mode. The date register and the command register are operative when the Z80 is in a read mode.

The S100 bus 10 is also connected to decoders 68, 70 and signal isolation buffers 72 and 74 of the command decoder circuit 12. Decoder 68 is coupled to receive the command control signal from the S100 bus ("PDBIN") which, when high, requests data from the currently addressed controller memory (RAM). Decoder 68 also receives an status output signal ("SINP") which when high, indicates that the address bus contains the address of an input device and the input data should be placed on the S100 data bus when PDBIN is active. The status output signal ("SOUT") from the S100 is coupled to the decoder 68 such that when it is high, it will indicate that the S100 bus contains the address of a controller. Decoder 70 compares or decodes the address information required from the S100 bus with the address as set by switches 71. The write and read data outputs of decoder 68 are connected to registers 60, 62, 64 and 66 respectively as shown such that when a low level data output is applied to these registers data will be loaded or unloaded. The read and write commands (RD & ZWR) from Z80 are buffered by isolation buffer 74. The address signals from buffer 72 are coupled to controller address bus 13 for input to the Z80 18.

Figure 3:
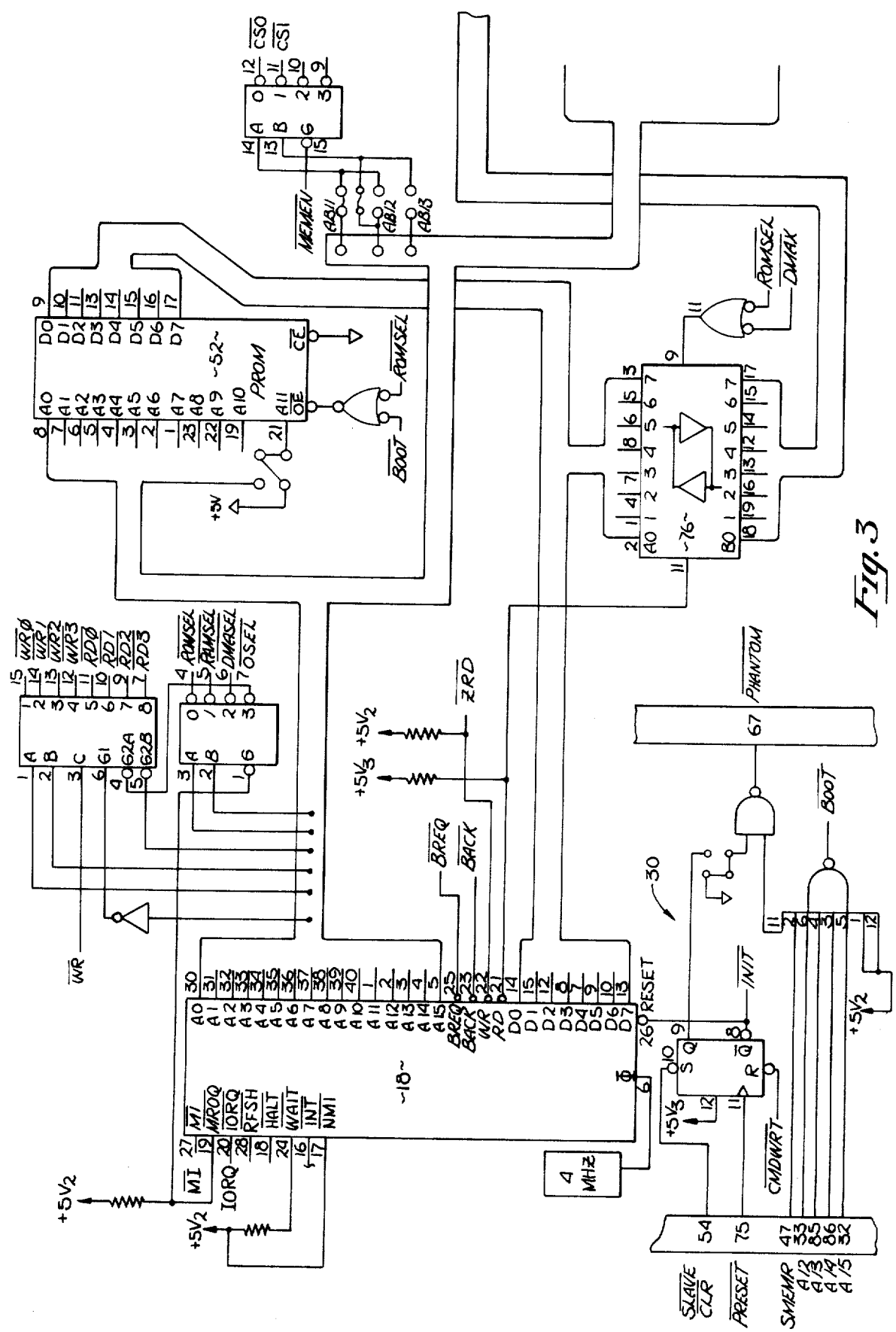
FIG. 3 is a detailed block diagram of the Z80 microprocessor and programable read only memory.

Referring next to FIG. 3, the Z80 18 is illustrated having address lines A0-A15, data lines D0-D7, and write and read lines which generate Z80 write (ZWR) and Z80 read (ZRD) signals. The Z80 is connected to reset circuit 30 which resets the Z80 upon receipt of a preset command from the S100 bus 10. The data lines of the Z80 are connected to data register 60 through tranceiver 76 and are also connected to the programmable read only memory (PROM) 52. The address lines of the Z80 are also connected to the PROM. The PROM contains the operating program that controls the Z80. The operating program provides various functions including initializing routines, routines for operation of the Z80 in response to S100 commands, and for providing S100 responses or commands as required for operation of the controller. The PROM also provides the initial byte of data (hereinafter referred to as "7E"). The address lines of the Z80 are also connected to RAM 24 and to decoders 78 and 80 which decodes address information for various control functions.

Figure 4A:
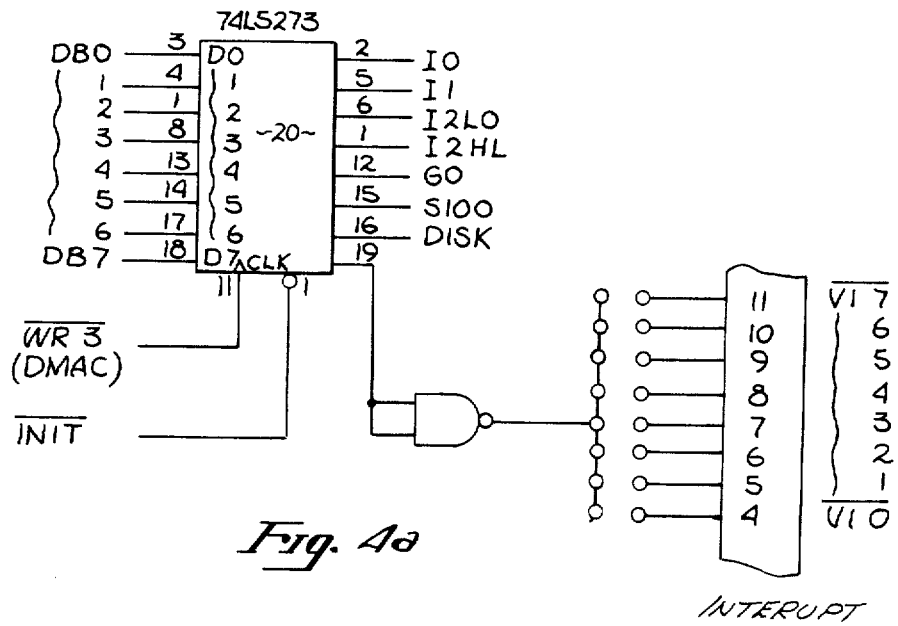
FIGS. 4a and 4b are a detailed block diagram of the input/output register and the GO circuit of FIG. 1.
Figure 4B:
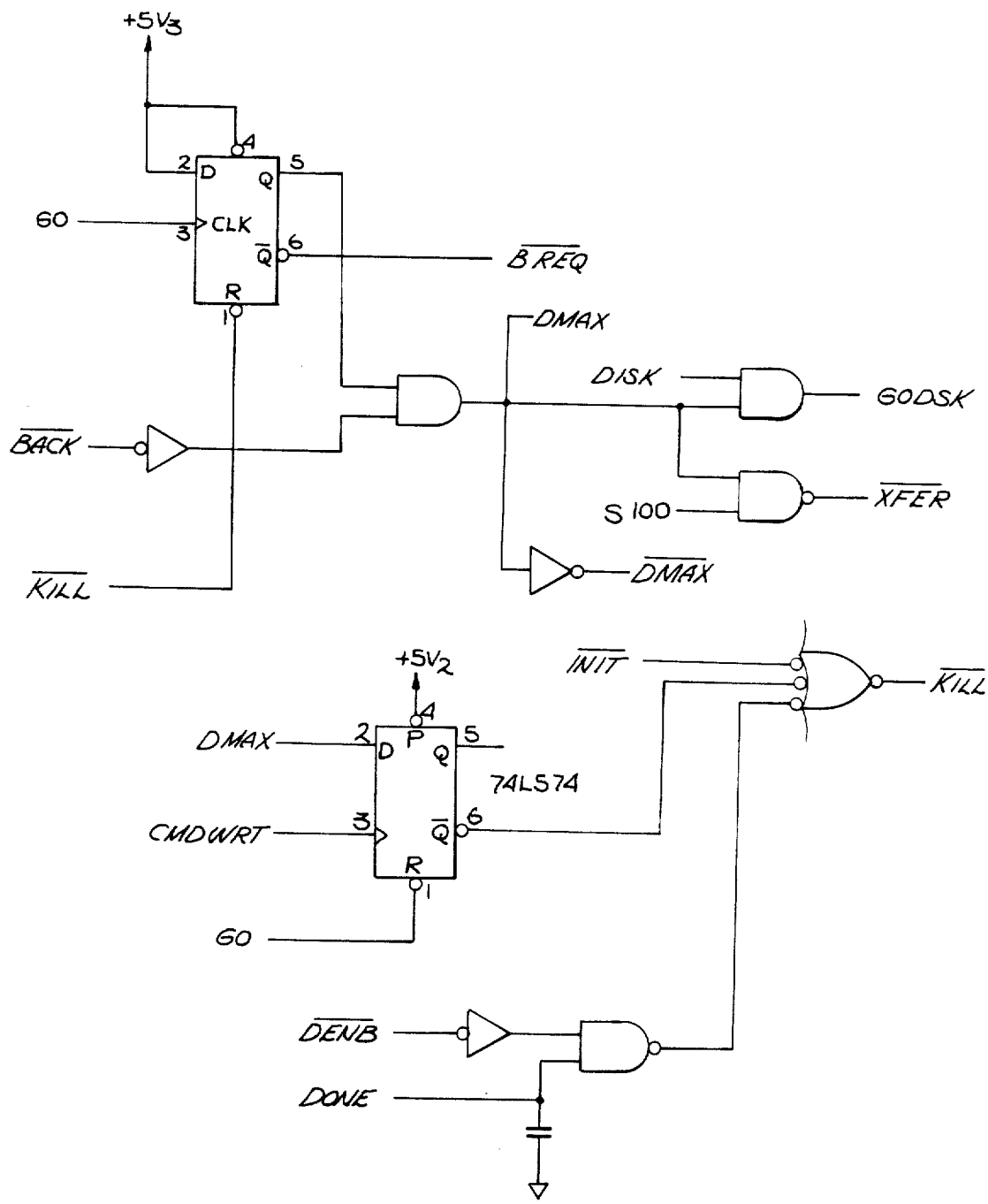

Referring to FIGS. 4a and 4b, control register 20 is connected to the Z80 18 through data bus 15. The outputs I0, I1, I2LO, and I2HI are the instructions from the Z80 that initialize the DMA counters. The GO, S100, and disk (DSK) outputs are fed into BUS ARBITER 32. The BUS ARBITER gives the DMA access to the address bus 15. The DMAX output signal acknowledges the DMA's access to the address bus.

Figure 5B:
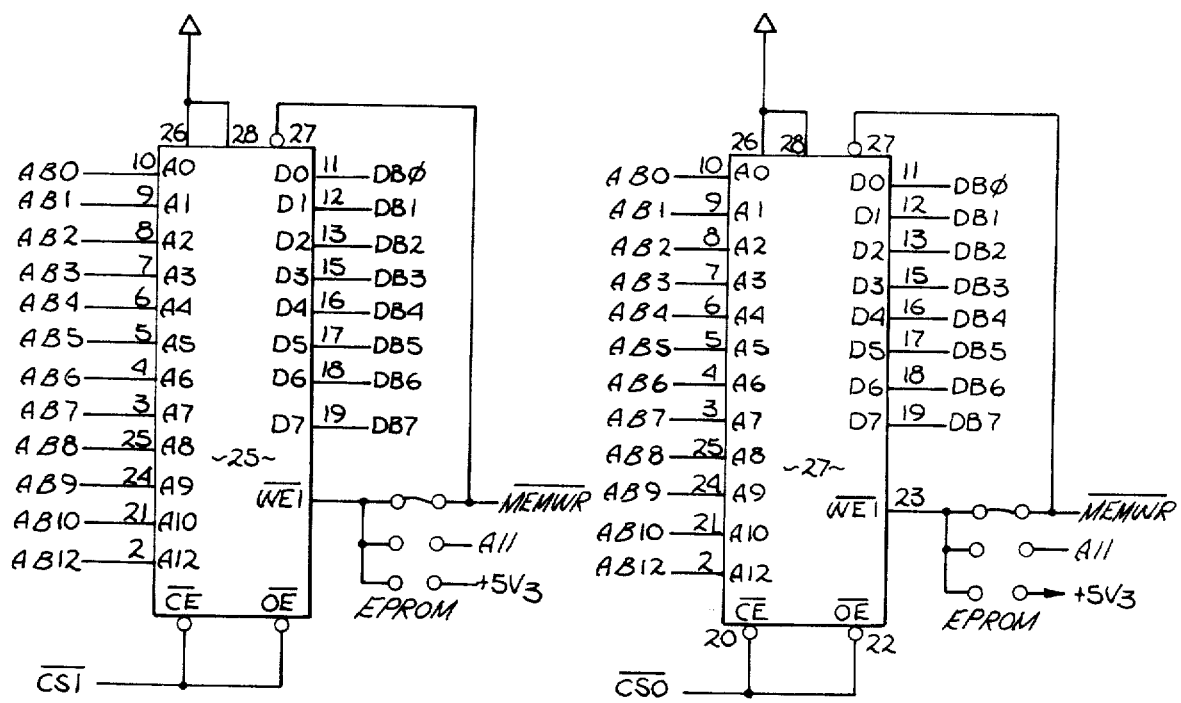
FIGS. 5a and 5b are a detailed block diagram of the DMA and RAM related circuitry of FIG. 1.
Figure 5A:
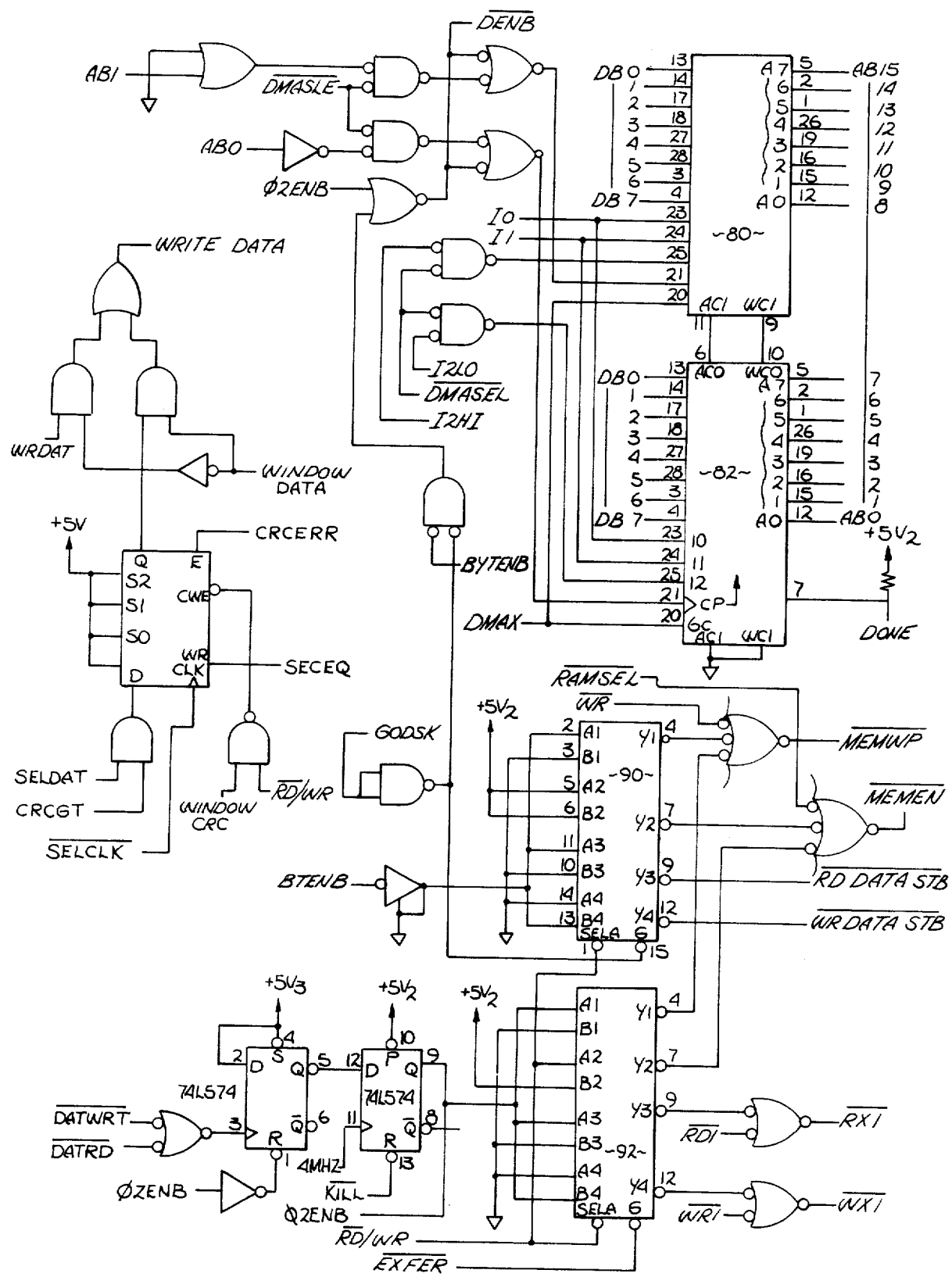

As shown in FIG. 5a, the DMA contains two word and address counters 80 and 82. The word counter tells how many bytes to save for transfers from the S100 or to put out in transfers to the S100 which, in the preferred embodiment, is a total of 518 per transfer block. The address counter gives the starting address in the RAM 24 and will advance the counter so that each successive 8 bits are written into or read out of the next available buffer in the RAM. The address counter will also generate a DONE signal when all of the data bits have been transferred. Upon receipt of the address and the byte enable (BYTENB) and the go disk (GODSK) signals, the DMA will generate memory address, word count and eventually a done signal for DMA transfer operations. The primary function of the DMA is to generate sequential memory addresses for the sequential transfer of data to or from the RAM.

In FIG. 5b, the RAM comprises two onboard 4K×8 memory chips 25 and 27 (which can be expanded to 8K×8 if desired). RAM chips 25 and 27 are selected according to chip select signals CS1 or CS0 generated by partial decoding of signals on the address bus 13 (See FIG. 3). The 4K bytes of RAM are organized under the control of the Z80 to provide storage of seven 518 byte blocks of data. Any data blocks may be written into or read out of the RAM at any time under the control of the Z80.

In FIG. 5a, multiplexer 14 is comprised of two multiplexers 90 and 92. Multiplexer 90 responds to the BYTENB and the GO DSK signals to generate a MEMWR signal which selects whether the RAM is in the read of the write mode. Multiplexer 90 also generates the STROBES (RDDATASTB & WRDATASTB) for both the read and the write modes. Multiplexer 92 responds to signals from the S-100 and the Z80 to tell the DMA whether it will be in the read or write modes. Inputs and outputs of the CRC 16 also are shown in FIG. 5a.

Figure 6:
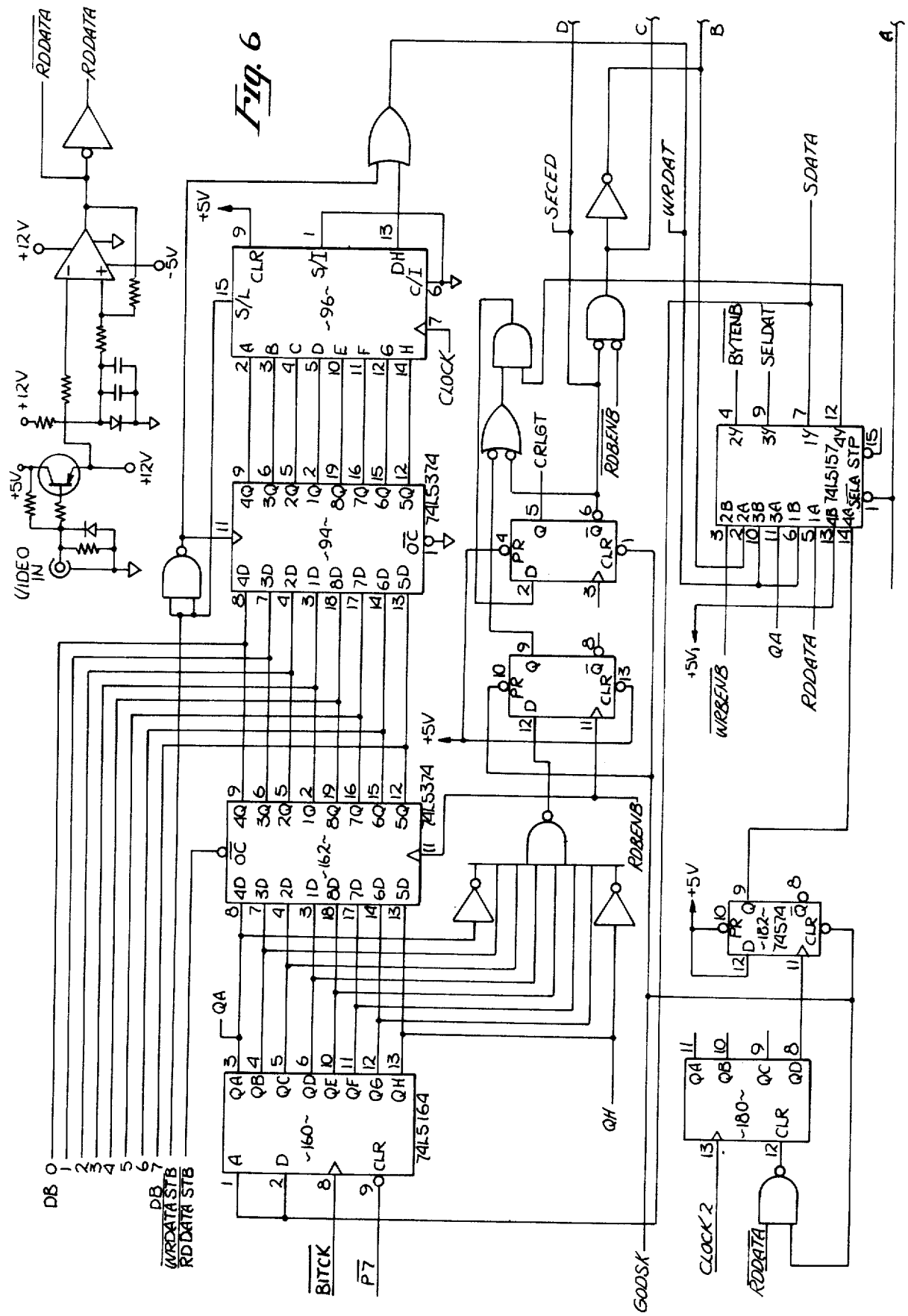
FIG. 6 is a detailed block diagram of the serializer and the parallelizer of FIG. 1.

Referring next to FIG. 6, serializer 26 is comprised of a buffer 94 connected to a parallel in serial out shift register 96. During the write mode the WRDATASTB from multiplexer 14 causes the serial data from RAM to be transferred to serializer 26. Buffer 94 receives the parallel data from the RAM and feeds it to register 96 to create the serial data signal, WRDAT, which is coupled into multiplexer 34.

Figure 7:
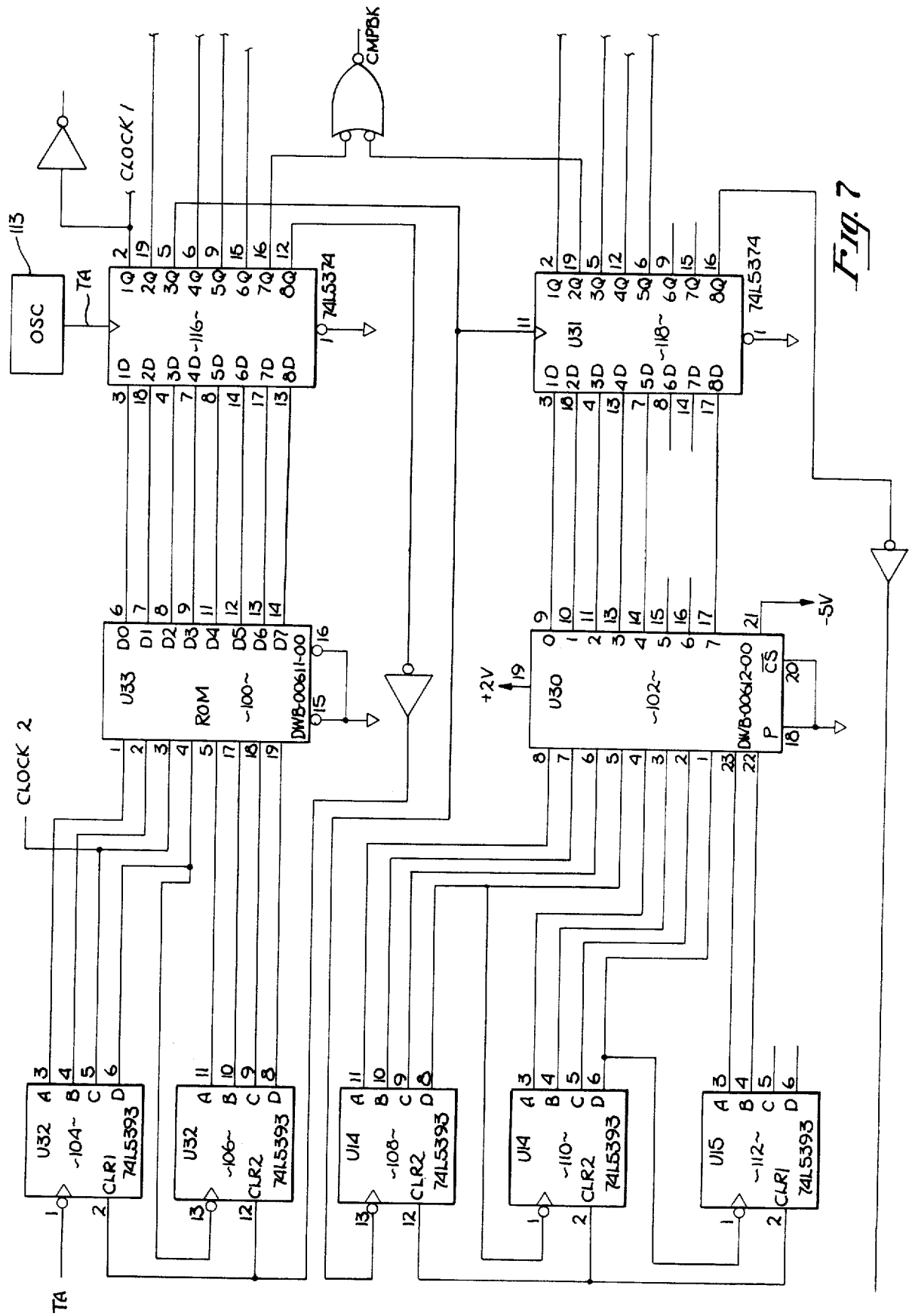
FIG. 7 is a detailed block diagram of the sync generators and related circuitry of FIG. 1.

In FIG. 7, the sync generators 38 and 40 are comprised of two programmable read only memories (PROM) 100 and 102 which operate as microengines to build sync signals. Copies of the PROMS' programs are attached hereto as "Exhibit A". PROM 100 is connected to counters 104 and 106, and memory 102 is connected to counters 108, 110 and 112. The PROMs maintain the data format and are driven by a 2.04545 (or 2.0625) megahertz clock from oscillator 113 which has been divided by 7 in order to generate appropriate sync and blanking signals corresponding to standard video screen displays. The PROMs 100 and 102 are coupled through latches 116 and 118 respectively to latch the PROM outputs. Sync generator 38 creates a write bit enable (WRBENB) signal which puts the data on the screen in the right place.

Figure 8:
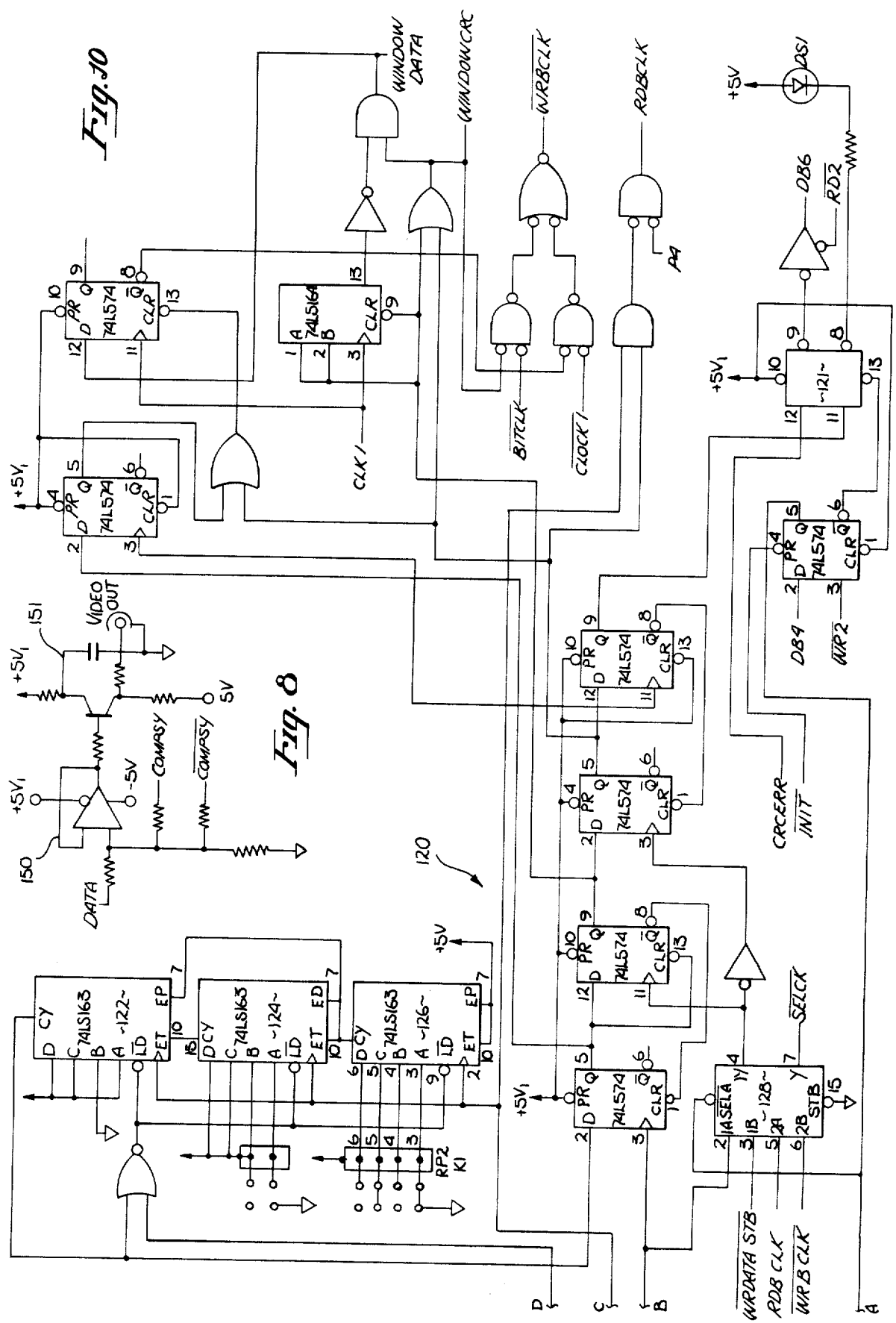
FIG. 8 is a detailed circuit diagram of the digital to analog converter utilized in the present invention.

In FIG. 8, the digital to analog converter 36 is shown having an opamp 150 which converts the write data, composite sync and composite blanking signals to an analog level to get a composite video signal. The digital to analog converter further comprises a buffer 151 which is capable of driving a coaxial cable to provide a buffered VIDEO OUT signal.

Figure 9:
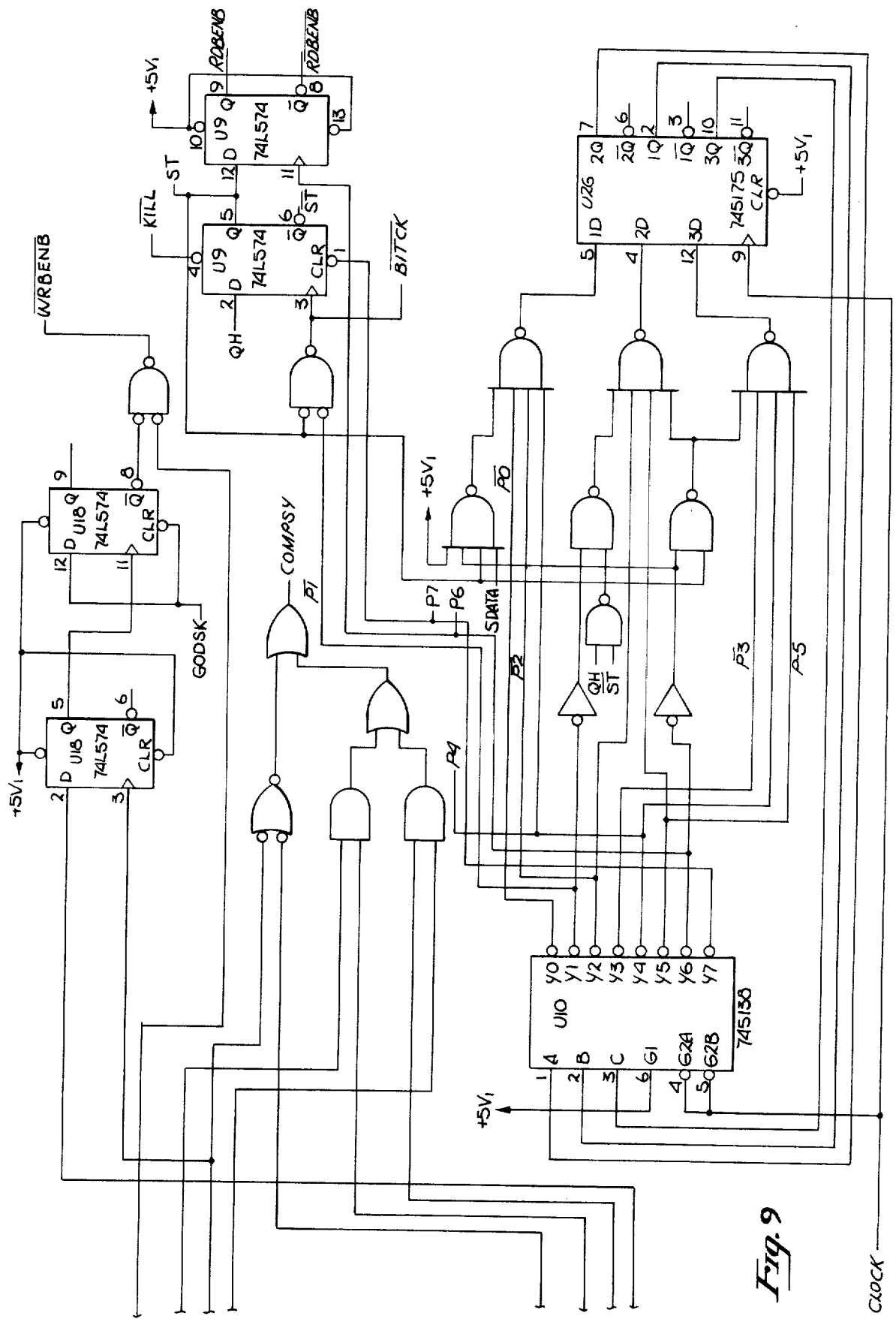
FIG. 9 is a detailed circuit diagram of the analog to digital converter, and the state sequencer.

Referring next to FIGS. 6 and 9, in the read mode the analog to digital converter 42 receives an analog video signal and converts it through opamp 152 into a serial bit data stream. The data stream is fed into detector 44 comprised of a 16 bit counter 180 and a divide by two shift register 182 which look for a stream of at least 32 zero bits. When 32 zero's have been detected a signal will be applied to multiplexer 34 along with the serial bit stream to create the serial data signal (SDATA) which is then applied to state sequencer 46. The state sequencer is clocked by a 7.15909 (or 7.21875) megahertz clock which is the output of oscillator 113 that has been divided in half. The clock defines 8 states (P0-P7). Each bit width consists of 7 states. In the beginning, the sequencer holds at state P6 until a data bit with the logical one is detected. It assumes this bit as the start bit of the following data byte. The sequencer then changes state to P7. In turn it resets parallelizer 28 and starts counting. Normally each bit cycle looks like P6-P0-P1-P2-P3-P4-P5, where the rising edge of P1 serves as bit clock for the data stream into parallelizer 28.

Parallelizer 28 is comprised of a serial in, parallel out shift register 160 connected to a buffer 162. The parallelizer converts the serial data stream into a parallel data stream which is applied through the DMA to buffer RAM. When the RAM is full, the contents are applied to the S100 bus.

In FIG. 10, the CRC generator/detector is comprised of CRC byte controller 120 and a latch 121. The CRC byte controller comprises buffer registers 122, 124, 126 and 128 which count how many bytes to move and where the CRC occurs. The CRC gate checks certain data portions of the block and splices the CRC (2 bytes) data on the end. The window data signal allows the data to be processed during the splice.

Referring to FIGS. 1 and 4a, in operation, during write mode, data blocks comprising approximately 518 data bytes will be received from the S100 bus 10 through I/O ports 12 to the Z80 18 and PROM 52. Upon receipt of a first data block, control register 20 generates a control signal which initializes the DMA 22. The BUS ARBITER gives the DMA access to the address bus 13 and the RAM access to the data from the S100. Upon receipt of a first address bit and a byte enable signal (BYTENB) from multiplexer 34, the DMA generates memory address, word count, and done signals for the sequential transfer of data to RAM 24, which temporarily stores the data.

Multiplexer 14 also responds to the BYTENB signals and the output of the BUS ARBITER 32 which controls the RAM 24 in the read or write mode. During each byte of transfer, one start bit and one stop bit are automatically appended by the multiplexer to the head and tail of each data byte. The start bit, and a write data STROBE (WRDATASTB), are fed into serializer 26. Serializer 26 receives parallel data on the controller data bus 15 from RAM 24 and the first data start bit from multiplexer 14 to generate a serial data (WRDAT) signal to the CRC generator 16. In response, the CRC then generates a write data (WRITE DATA) signal comprising the serial data and check bytes to the digital to analog converter 36. Simultaneously, the digital to analog converter 36 receives composite blanking signals from sync generator 40 such that the video signal will have a predetermined format. The digital to analog converter 36 mixes the digital write data, the composite sync and the composite blanking signals and then converts the mixed digital signal to provide an analog video output.

In operation the read and write mode start bits are fed into the CRC chip along with the data bytes to receive or generate the CRC information. During the write mode the CRC generator will append two CRC bytes to the end of the serial data stream according to the polynomial:

$X^{}16 + X^{}11 + X^{**}4 + 1$.

During the read mode, the data stream following the sync byte (7E) will be coupled to the CRC chip which checks the data for errors. If there are no errors then all the subsequent replications of the same data block will be ignored. An error clock will be generated in the middle of the stop bit of the second CRC byte. This clock will then strobe the CRC error information into the latch 121 into the Z80. If no error is indicated, the successive replicated blocks will be ignored. If an error is indicated, successive replicated blocks will be read until there are no errors. If there are no more identical blocks to be read, a hard error will be indicated by the CRC.

Figure 11:
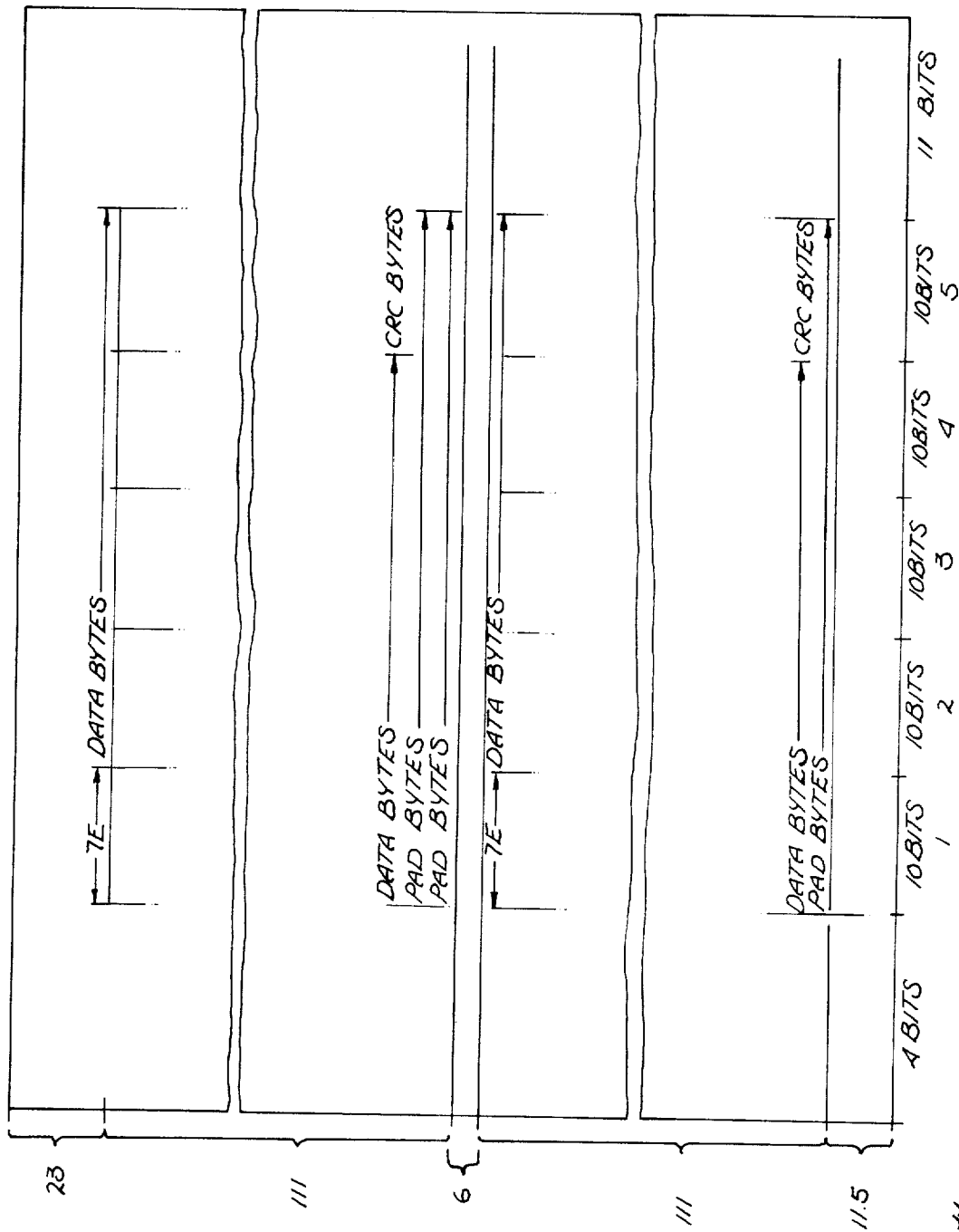
FIG. 11 an illustration of a video screen on which the preferred data block format of the present invention is illustrated.

Referring next to FIG. 11, the data stored in the video tape is split into data blocks consisting of preferably approximately 518 bytes of data. Each block is composed of one sync byte (7E) followed by a data byte stream and two CRC bytes. Each byte consists of one start bit (logical 1) followed by eight data bits and one stop bit (logical 0).

Each byte synchronizes to each start bit as well to a specific horizontal trace line. Each horizontal trace consists of five data bytes. On each horizontal trace, the bit clock clocks out 15 bit spaces at the head and tail of the five data bytes. The first line of each data block has a sync byte "7E" after the 4 clocked bits prior to the first data byte.

Each vertical trace frame consists of 262.5 horizontal lines in the U.S. In the preferred embodiment, the first 23 horizontal lines are reserved as vertical blanking. The following 111 lines constitute the first data block. The next 6 lines are also reserved as blanking, while the next 111 lines constitute the second data block. The remaining 11.5 horizontal lines are also reserved as vertical blanking. This format is selected for its compatibility with standard VCRs. No timing changes need be made for synchronization. The horizontal and vertical lines assure that the data blocks would be viewable in fixed positions on a video screen when viewed by trained personnel. If desired, blocks up to 560 bytes of data may be used by reducing the number of lines reserved for spacing between the data blocks as long as there are at least 32 zero bits remaining between blocks.

There are many advantages to the backup controller of the present invention. The controller provides means to generate the start and stop bit of each byte which aids in data retrieval. The data is organized into data blocks which conform with standard video screens. The data is easily synchronized to TV signals for application in a VCR during the write mode. Data blocks are automatically replicated for error detection thereby reducing the number of hard and soft errors.

Obviously, while the invention has been disclosed and described with respect to a specific preferred embodiment thereof, it will be understood by those skilled in the art that various changes in form and detail may be made therein without departing from the spirit and scope of the invention.

I claim:

1. A controller for coupling a video cassette recorder to a computer system bus, said bus adapted to transfer data on the bus to and from a computer, said controller comprising;

memory means for storing blocks of data, said blocks comprising a plurality of digital data bytes received from said bus for transfer to said video cassette recorder, and received from said video cassette recorder for transfer to said bus;

control means coupled to said bus and said memory means for generating control signals to cause digital data placed on said bus to be stored in said memory means, and to cause digital data stored in said memory means to be placed on said bus;

output means for transferring data from said memory means to said video cassette recorder; and input means for transferring data from said video cassette recorder to said memory means;

wherein said output means comprises:

(i) horizontal sync and vertical sync and blanking means coupled to said control means for generating sync and blanking signals corresponding to a predetermined video format; and (ii) digital to analog conversion means having said horizontal sync, vertical sync and blanking means, and said memory means connected as inputs for mixing said sync and blanking signals with data stored in said memory means to provide a mixed signal and converting the mixed signal to an output analog video signal; and wherein said input means comprises:

(i) analog to digital conversion means for converting the data portions of an input analog video signal into a serial digital signal; and (ii) parallelizer means having said analog to digital conversion means as an input and coupled to said memory means for converting said serial digital signal into digital data bytes prior to storing in said memory means.

2. The controller of claim 1 wherein said data on said bus means comprises parallel data, and further comprising serial means coupled to said control means for converting the parallel data on said bus into serial data prior to being inputted into the digital to analog conversion means.

3. The controller of claim 1 further comprising redundancy reducing code generation means coupled to said input means and said output means for generating redundancy codes for the data transferred between said bus and said video cassette recorder; and wherein said output means further comprises replication means for replicating the data transferred from said bus, and associated redundancy codes, to said video cassette recorder; and wherein said input means further comprises error detection means coupled to said parallelizer means for detecting errors in the data portions of said analog video signal.

4. The controller of claim 3 wherein said error detection means comprises a sync byte detection means for detecting the first byte of a data block, and a zero detection means coupled to said analog to digital converter means for detecting an introductory signal preceding each data block.

5. The controller of claim 4 wherein said introductory signal comprises at least 32 logical "0"s.

6. The controller of claim 1 wherein said memory means comprises a random access memory for storing a plurality of data blocks and direct memory access means for buffering data transferred by said input means and said output means.

7. The controller of claim 1, wherein said mixed signal and said serial digital signal are comprised of data bytes, each data byte having a start bit, a stop bit, and data bits therebetween.

8. The controller of claim 7, further comprising means for generating said start bit and stop bit for each data byte.

9. The controller of claim 1, wherein said data is transferred by said input means and said output means in blocks comprised of at least 518 data bytes.

10. The controller of claim 1, further comprising first multiplexing means coupled to said control means for generating a first read data start bit in response to a read command for each and every data byte, and for generating a first write data start bit in response to a write command for each and every data byte.

11. The controller of claim 1, further comprising means for providing a signal to said memory means, causing said memory means to sequentially store the data bit streams and for providing a signal to said error detection means causing the error detection means to replicate data upon receipt of a command from said command means and upon receipt of the serial data byte streams.

12. A video cassette recorder backup system comprising:

bus means for providing and receiving parallel data byte streams;

controller means for coupling a video cassette recorder to said bus means, said controller means comprising;

command means generating a read command for reading the data bytes onto said bus means or a write command for writing the data bytes from said bus means;

circuit means interconnecting said command means and said bus means for transfer of data bytes between said command means and bus means;

processing means for processing data bytes received from said command means;

memory means coupled to said command means and to said processing means for storing a plurality of said data bytes in sequential order of receipt;

serial means coupled to said memory means for converting said parallel data byte streams into serial data byte streams;

sync and blanking means for generating video sync and blanking signals;

digital to analog converter means for combining said sync and blanking signals with said serial data byte streams from said serial means and converting the combined signal to an analog video signal;

replication means coupled to said digital to analog converter means for replicating said analog video signal in data blocks a predetermined number of times;

analog to digital converter means for converting an analog video signal to a digital serial data bytes stream;

parallelizer means for converting said serial data byte stream from said analog to digital converter means into a parallel data byte stream, with said parallelizer means coupled to said memory means;

stream detection means for detecting said data byte stream from said analog to digital converter means;

sync byte detection means for detecting the first data byte of each serial data byte stream received from said parallelizer means;

error detection means for detecting errors in said data bytes to determine whether an error is contained therein; and means for ignoring subsequent replicated data blocks when no error is detected in a block of data bytes.

13. The controller of claim 12, further comprising first multiplexing means coupled to said command means for generating a read data start bit in response to a read command into said parallelizing means, and a write data start bit in response to a write command into said serial means.

14. The controller of claim 12 further comprising second multiplexing means for providing a signal to said memory means causing said memory means to sequentially store the data byte streams.

15. The controller of claim 12 further comprising means coupled to analog to digital means for generating a clock to clock each bit of each data byte into said parallelizer means.

16. A method for transferring data from a computer system bus to a video cassette recorder comprising the steps of:

placing parallel data bytes from the computer onto the bus;

isolating the bus from the video cassette recorder by temporarily storing one or more blocks of the parallel data bytes in predetermined locations in a random access memory;

converting stored blocks of parallel data bytes into a serial data stream;

converting the serial data stream into an analog video signal; and writing the analog video signal to the video cassette recorder.

17. A method for transferring data from a video cassette recorder to a computer system bus comprising the steps of:

reading an analog video signal from said video cassette recorder;

removing the video sync and blanking signals from said analog video signal to provide a stripped video signal;

converting said stripped analog video signal into a serial data stream comprising one or more data blocks;

converting the serial data stream into a parallel bit stream comprised of parallel data bytes;

isolating the parallel data byte source from the bus by temporarily storing the parallel data bytes in a random access memory as one or more blocks of data; and placing the stored parallel data bytes onto the bus without any video sync or blanking signals.

18. The method as defined in claim 17 including selecting desired data bytes from data blocks from the random access memory for placing onto the bus in response to a command request.

19. A controller for transferring data between a bus and a video line, with the data on the bus in parallel data byte streams without any video sync or blanking signals, said controller comprising in combination:

command means generating a read command for reading the data bytes onto the bus or a write command for writing the data bytes from the bus;

circuit means interconnecting said command means and the bus means for transfer of data bytes between said command means and the bus;

processing means for processing data bytes received from said command means;

memory means coupled to said command means and to said processing means for storing a plurality of said data bytes in sequential order of receipt;

serial means coupled to said memory means for converting said parallel data byte streams into serial data byte streams;

sync and blanking means for generating video sync and blanking signals;

digital to analog converter means for combining said sync and blanking signals with said serial data byte streams from said serial means and converting the combined signal to an analog video signal;

replication means coupled to said digital to analog converter means for replicating said analog video signal in data blocks a predetermined number of times;

connecting means for connecting said analog video signal to a video line;

analog to digital converter means for converting an analog video signal from a video line to a digital serial data byte stream;

parallelizer means for converting said serial data byte stream from said analog to digital converter means into a parallel data byte stream, with said parallelizer means coupled to said memory means;

stream detection means for detecting said data byte stream from said analog to digital converter means;

sync byte detection means for detecting the first data byte of each serial data byte stream received from said parallelizer means;

error detection means for detecting errors in said data bytes to determine whether an error is contained therein; and means for ignoring subsequent replicated data blocks when no error is detected in a block of data bytes.

20. The controller of claim 19 further comprising first multiplexing means coupled to said command means for generating a read data start bit in response to a read command into said parallelizing means, and a write data start bit in response to a write command into said serial means.

21. The controller of claim 19 further comprising second multiplexing means for providing a signal to said memory means causing said memory means to sequentially store the data byte streams.

22. The controller of claim 19 further comprising means coupled to analog to digital means for generating a clock to clock each bit of each data byte into said parallelizer means.

23. A controller for coupling a video line to a bus, the bus being adapted to transfer data on the bus to and from a computer, said controller comprising in combination:
    memory means for storing blocks of data, said blocks comprising a plurality data bytes received from the bus for transfer to the video line, and received from the video line for transfer to the bus;
    control means coupled to the bus and said memory means for generating control signals to cause digital data placed on the bus to be stored in said memory means, and to cause digital data stored in said memory means to be placed on the bus;
    output means for transferring data from said memory means to the video line; and
    input means for transferring data from the video line to said memory means;
    wherein said output means comprises:
        (i) horizontal sync and vertical sync and blanking means coupled to said control means for generating sync and blanking signals corresponding to a predetermined video format; and
        (ii) digital to analog conversion means having said horizontal sync, vertical sync and blanking means, and said memory means connected as inputs for mixing said sync and blanking signals with data stored in said memory means to provide a mixed signal and converting the mixed signal to an output analog video signal; and
    wherein said input means comprises:
        (i) analog to digital conversion means for converting the data portions of an input analog video signal into a serial digital signal; and
        (ii) parallelizer means having said analog to digital conversion means as an input and coupled to said memory means for converting said serial digital signal into digital data bytes prior to storing in said memory means.

24. The controller of claim 23 further comprising redundancy reducing code generation means coupled to said input means and said output means for generating redundancy codes for the data transferred between said bus and said video cassette recoder; and
    wherein said output means further comprises replication means for replicating the data transferred from said bus, and associated redundancy codes, to said video cassette recorder; and
    wherein said input means further comprises error detection means coupled to said parallelizer means for detecting errors in the data portions of said analog video signal.

25. The controller of claim 23 wherein said memory means comprises a random access memory for storing a plurality of data blocks and direct memory access means for buffering data transferred by said input means and said output means.

26. The controller of claim 23 wherein said error detection means comprises a sync byte detection means for detecting the first byte of a data block, and a zero detection means coupled to said analog to digital converter means for detecting an introductory signal preceding each data block.

27. The controller of claim 26 wherein said introductory signal comprises at least 32 logical "0"s.

28. The controller of claim 23 wherein said mixed signal and said serial digital signal are comprised of data bytes, each data byte having a start bit, a stop byte, and data bits therebetween.

29. The controller of claim 28, further comprising means for generating said start bit for each data byte.

30. A method for transferring data from a bus to a video line, comprising the steps of:
    placing parallel data bytes onto the data bus;
    isolating the bus from the video line by temporarily storing one or more blocks of the parallel data bytes in a random access memory;
    converting stored blocks of parallel data bytes into a serial data stream;
    converting the serial data stream into an analog video signal; and
    writing the analog video signal on the video line.

31. A method for transferring data from a video line to a bus, comprising the steps of:
    reading an analog video signal from the video line;
    removing the video sync and blanking signals from the analog video signal to provide a stripped video signal;
    converting the stripped video signal into a serial data stream comprising one or more data blocks;
    converting the serial data stream into a parallel bit stream comprised of parallel data bytes;
    isolating the parallel data byte source from the bus by temporarily storing the parallel data bytes in a random accesss memory as one or more blocks of data; and
    placing the stored parallel data bytes onto the bus without any video sync blanking signals.

32. The method as defined in claim 31 including selecting desired data bytes from the random access memory for placing onto the bus in response to a command request.

* * * * *